United States Patent
Ryymin et al.

(10) Patent No.: US 7,753,817 B2
(45) Date of Patent: Jul. 13, 2010

(54) ARRANGEMENT IN A PLANETERY GEARING

(75) Inventors: Ari Ryymin, Jyväskylä (FI); Timo Yrjönen, Kuohu (FI)

(73) Assignee: Moventas Oy, Jyvaskyla (FI)

(*) Notice: Subject to any disclaimer, the term of this patent is extended or adjusted under 35 U.S.C. 154(b) by 550 days.

(21) Appl. No.: 11/628,580

(22) PCT Filed: Jul. 6, 2005

(86) PCT No.: PCT/FI2005/050269

§ 371 (c)(1),
(2), (4) Date: Dec. 4, 2006

(87) PCT Pub. No.: WO2006/053940

PCT Pub. Date: May 26, 2006

(65) Prior Publication Data

US 2007/0197339 A1     Aug. 23, 2007

(30) Foreign Application Priority Data

Jul. 15, 2004  (FI) .................................. 20045274
Dec. 15, 2004 (FI) .................................. 20045483

(51) Int. Cl.
    *F16H 48/30*      (2006.01)
(52) U.S. Cl. .................. 475/150; 475/339; 475/342
(58) Field of Classification Search ............... 475/159, 475/160, 339, 342; 74/467, 468; 290/1 C, 290/44, 55
See application file for complete search history.

(56) References Cited

U.S. PATENT DOCUMENTS

| | | | |
|---|---|---|---|
| 3,960,029 A * | 6/1976 | Eichinger | 74/413 |
| 6,067,734 A * | 5/2000 | Kallenberger | 37/395 |
| 6,176,804 B1 | 1/2001 | Kekki et al. | |
| 7,008,348 B2 * | 3/2006 | LaBath | 475/338 |

FOREIGN PATENT DOCUMENTS

| | | |
|---|---|---|
| EP | 1045140 | 10/2000 |
| EP | 1431575 | 6/2004 |
| GB | 2381047 A * | 4/2003 |
| WO | WO 03031812 A1 * | 4/2003 |
| WO | 03078870 | 9/2003 |

* cited by examiner

*Primary Examiner*—David D Le
(74) *Attorney, Agent, or Firm*—Fildes & Outland, P.C.

(57) ABSTRACT

An arrangement in a planetary gearing includes a rotatable shaft connected to the planet wheel carrier of planet wheels, an internal gear and a sun wheel, wherein the planet wheels operatively engage by their coggings, i.e. mesh, with the outermost fixed-position cogging of the internal gear and with the centrally located cogging of the sun wheel. The power is transmitted from the sun wheel to the input shaft of the following stage by a coupling permitting radial and/or angular deflection. The lubrication system includes a connection permitting rotation and deflection between the frame and the planet wheel carrier.

6 Claims, 10 Drawing Sheets

ARRANGEMENT IN A PLANETERY GEARING

Figure 1:
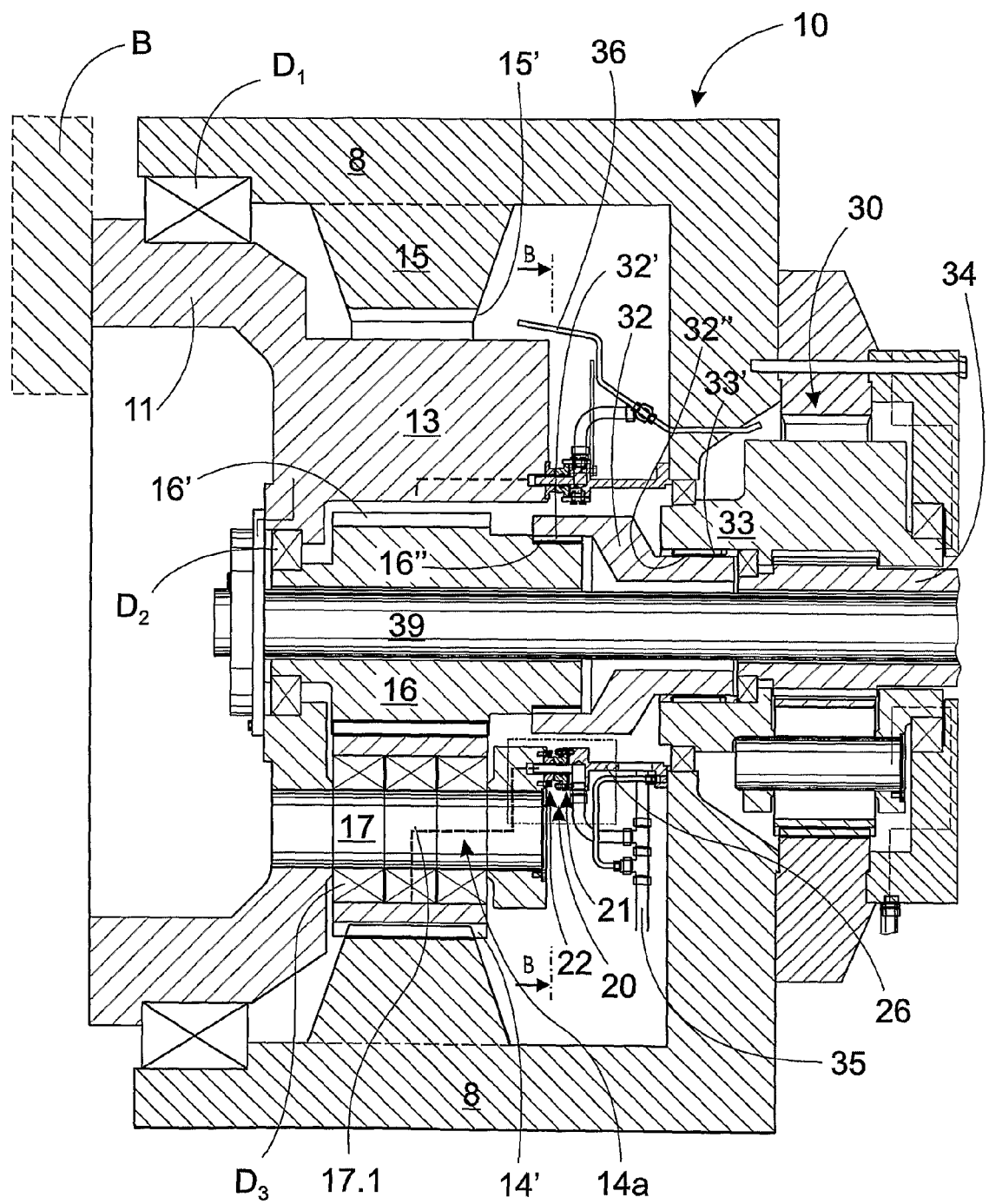

The invention relates to an arrangement in a planetary gearing comprising a rotatable shaft connected to a planet wheel carrier of planet wheels, an internal gear and a sun gear, wherein the planet wheels operatively engage by their coggings, i.e. mesh, with the outmost located fixed-position cogging of the internal gear and with the centrally located cogging of the sun wheel, and from which sun wheel the power is transmitted to the frame-supported input shaft of the following stage, and in which arrangement the supporting of the planetary gearing allows it a load-induced linear and/or angular deflection relative to the frame, and which planetary gearing includes a lubrication oil system for lubricating the said meshes of the planetary gearing. The invention relates particularly to a planetary gearing of a wind power plant and further to a two-stage planetary gearing and particularly to lubrication of the first stage.

Patent publications FI 108959B and EP 1045140A2 propose gearing solutions for wind turbines. These publications do not include a more detailed description of the lubrication system. It is fairly common to use splash lubrication in low-power gearings, wherein a closed casing contains the lubrication oil level at a certain altitude, such that oil is conveyed to all meshes and bearings by means of rotating machine elements. Splash lubrication is not sufficient in powerful gearings and it is not suitable if the gearing cannot be encased.

EP publication 274874 sets forth one splash lubrication arrangement. This requires a reasonable rotation speed for the planet wheel carrier in order to make the oil flow, by means of the centrifugal force, to the oil diverter of the planet wheel carrier and further to the oil supply channels of the planet wheels. With the wind turbine the rotation speed remains so low that this solution is not applicable.

Publication U.S. Pat. No. 6,602,158 sets forth a planetary gearing provided with a special lubrication oil supply system. In this solution lubrication oil is conveyed via a hollow shaft and forced radially, by means of the casing, to the end channel of the planet wheel carrier and further to the hollow shafts of the planet wheels. From these oil is distributed to the needle bearings. This type of arrangement requires a closed structure, which is not always feasible. In addition, a hollow center channel may be reserved for another use as is the case in the wind turbine, wherein the center channel is provided with a bar for controlling the blade angle of the blade assembly.

Publications WO03/078870 and EP1431575 disclose gearing solutions for wind turbines, wherein lubrication oil is led to the planetary gearing through elements permitting rotation. These solutions, however, do not comprise a coupling according to publication FI 108959B, which would allow a slight angular or linear deflection between the gearing and the frame. The proposed lubrication oil supply solutions do not have a suitable construction in case of angular or radial deflections.

In powerful planetary gearings splash lubrication is not sufficiently efficient, but the lubrication oil must be supplied by means of forced lubrication. At high loads, such as in the wind turbine application, the support frame will bend causing angular and/or linear deflections to the output shaft, i.e. the sun wheel, as well as to the planet wheel carrier.

The objective of this invention is to provide an advantageous application in a planetary gearing, which eliminates the above mentioned problems and provides useful lubrication for the planet wheel meshes and bearings in a planetary gearing. The characteristic features of the invention are set forth in claim 1. A connection permitting rotation and angular/radial deflection provides efficient lubrication oil supply.

In one embodiment rotating ring seals slide against fixed ring seals forming thus in pairs a ring channel inbetween, and an oil supply unit is arranged in this ring channel. Connecting elements, the fixed supply unit and the rotating ring channel can naturally be mutually exchanged.

In one embodiment one pair of ring seals is supported by springs allowing thus a remarkable angular and/or linear deflection.

Other embodiments and advantages of the invention are described below in connection with an application example.

Figure 2:
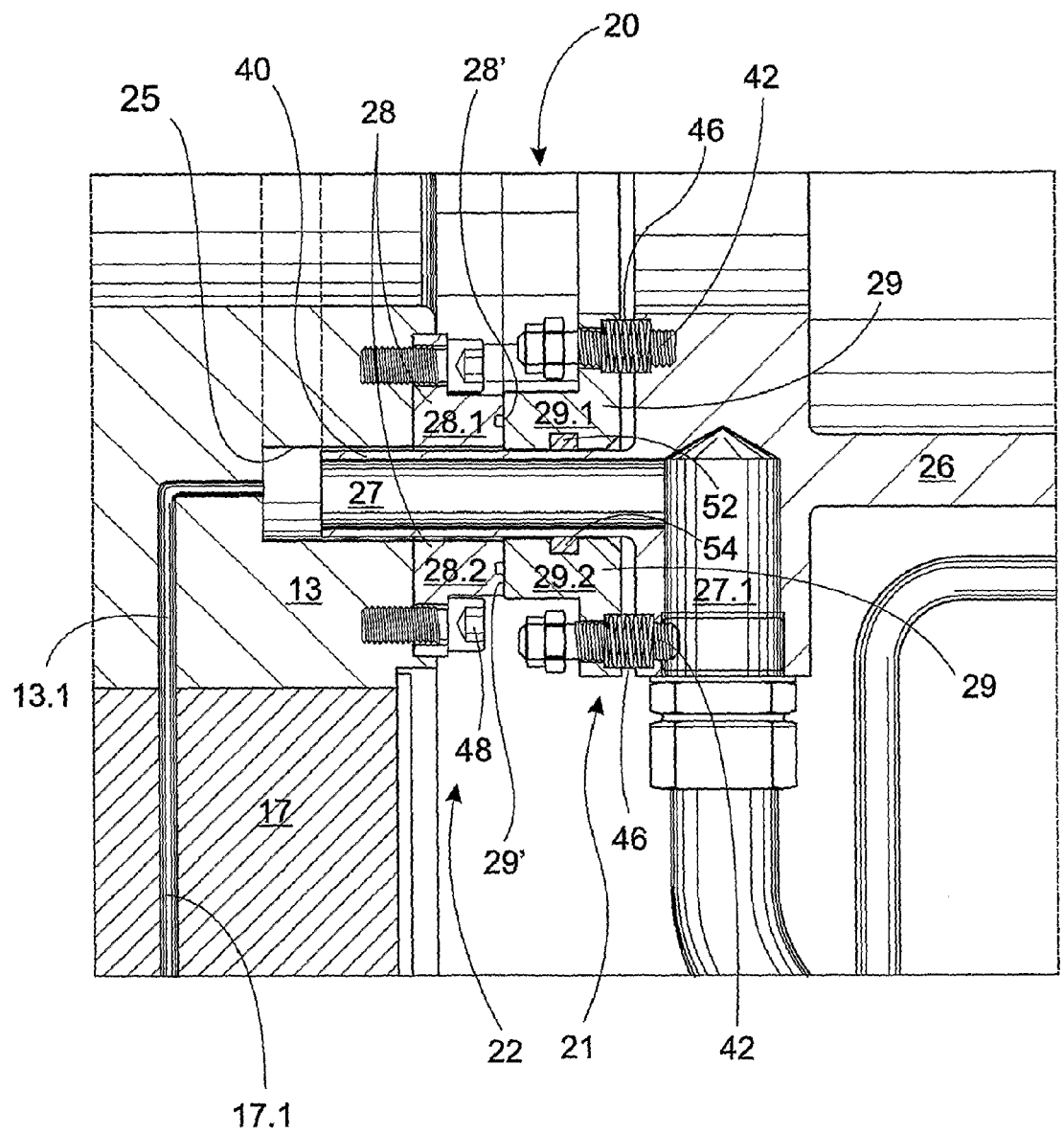
Figure 3:
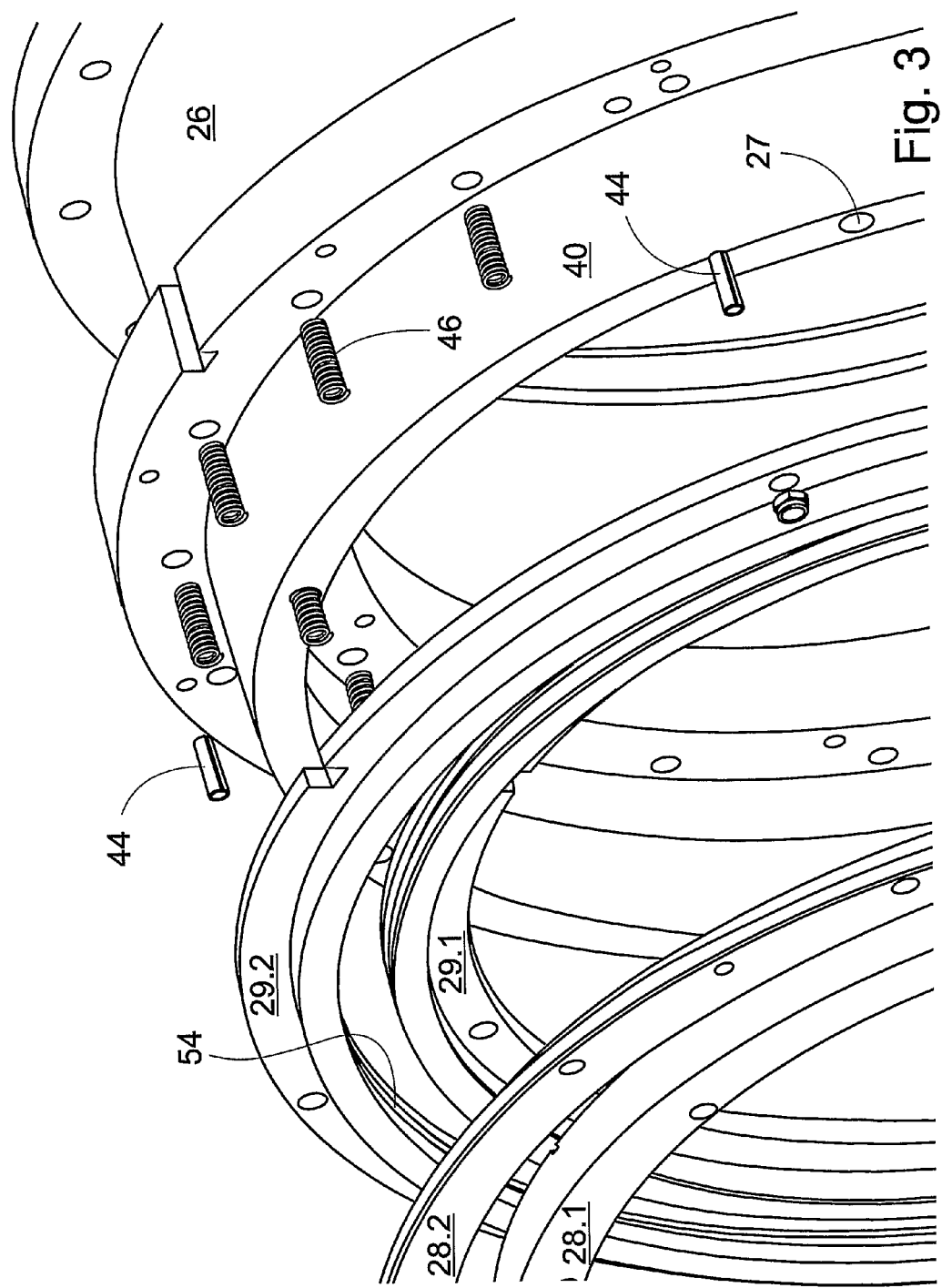

The invention is described below by making reference to the enclosed drawings, in which FIG. 1 illustrates a two-stage planetary gearing of a wind turbine FIG. 2 illustrates a lubrication oil supply connection permitting rotation FIG. 3 is an exploded view of sealing components of the construction of FIG. 2

Figure 4:
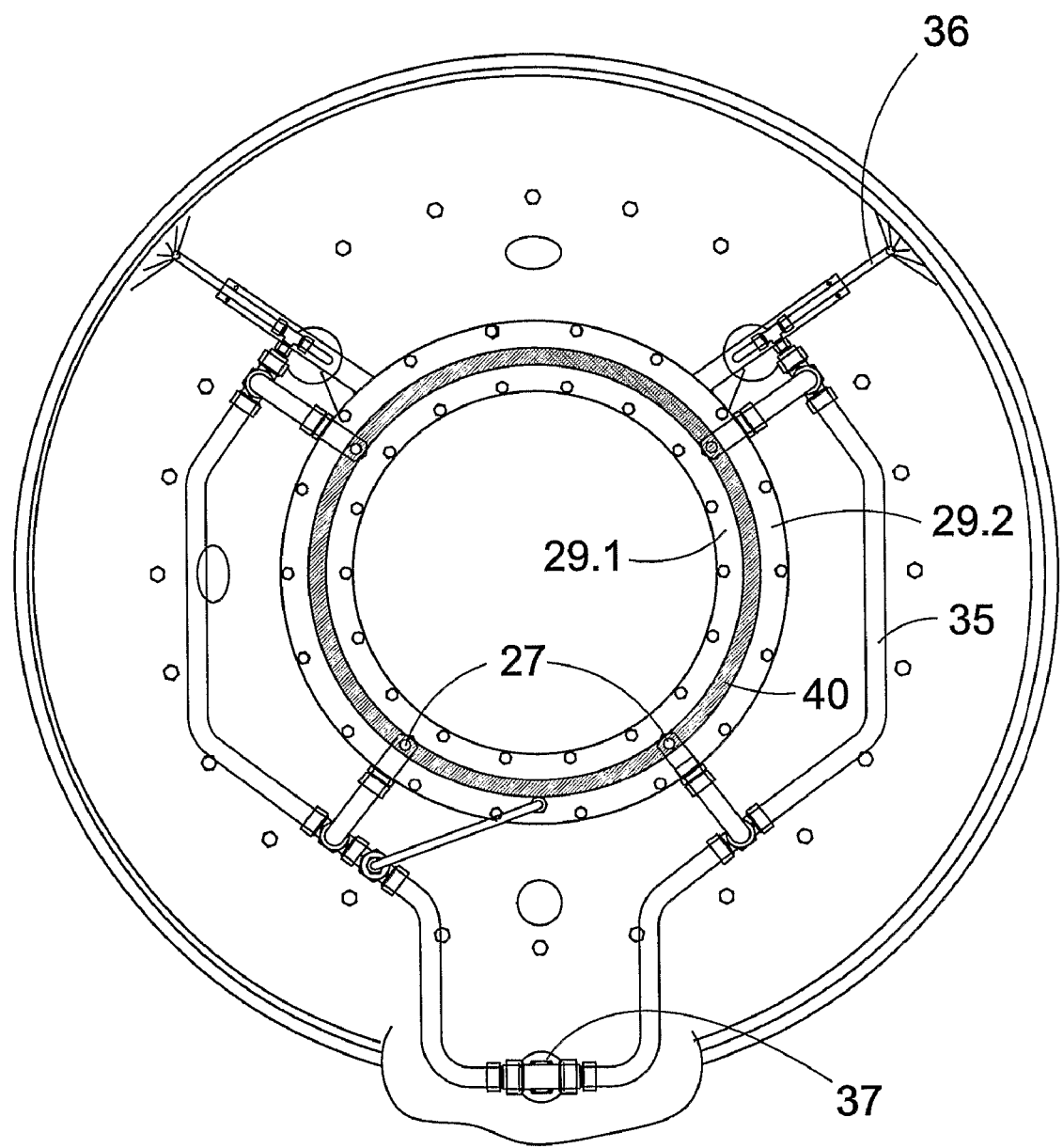

FIG. 4 is a sectional view of detail III-III of FIG. 2

Figure 5:
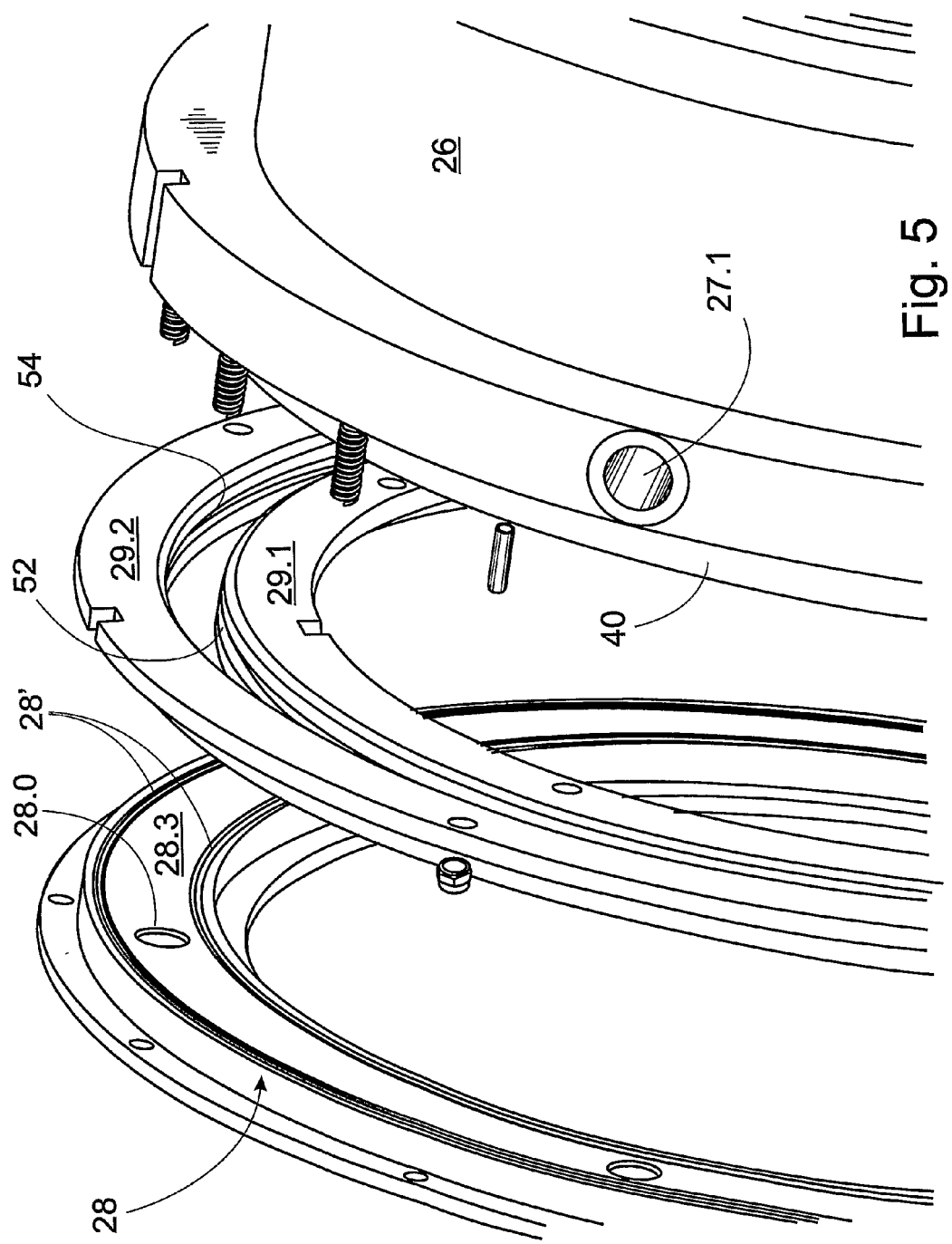
Figure 6:
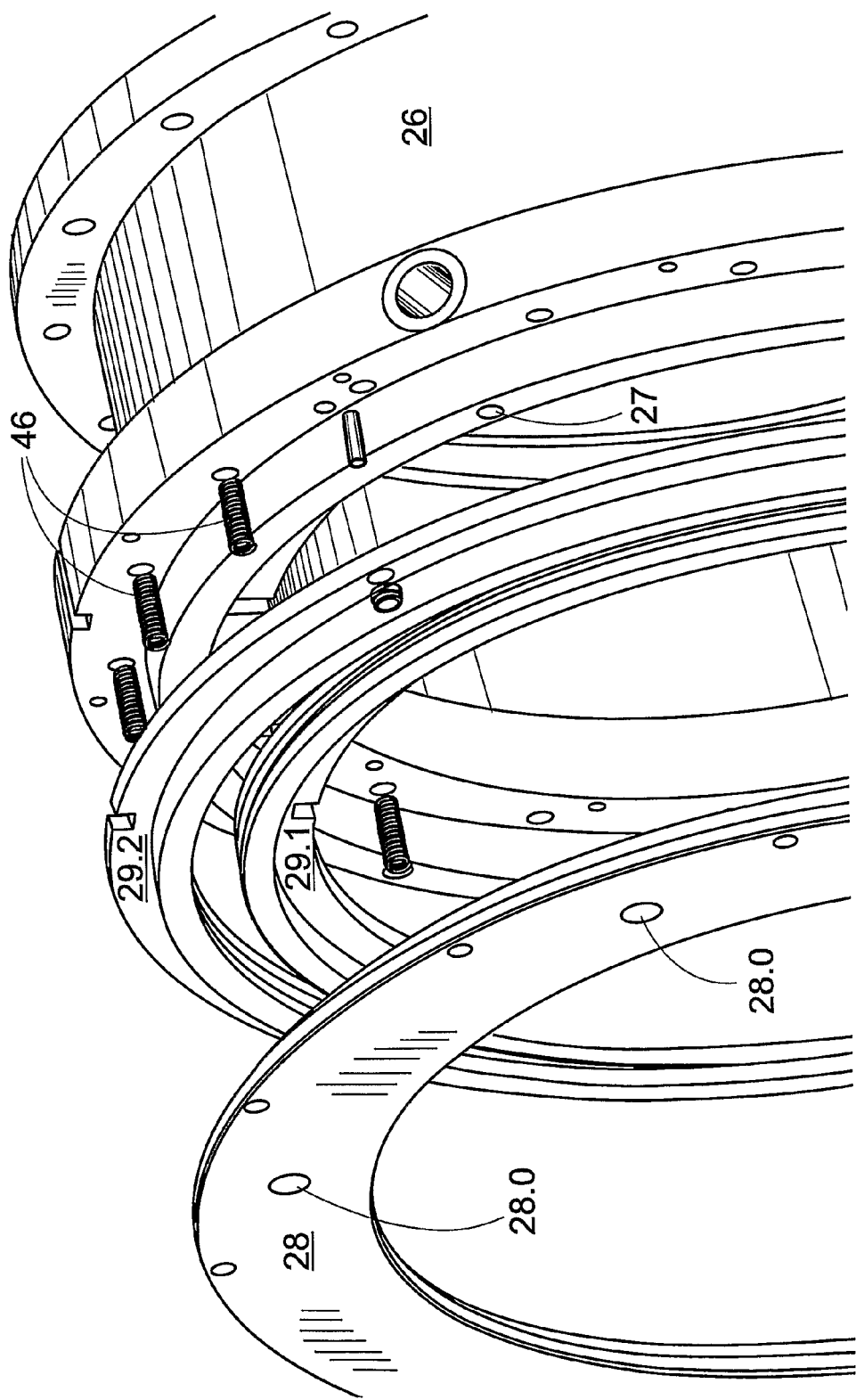
Figure 7:
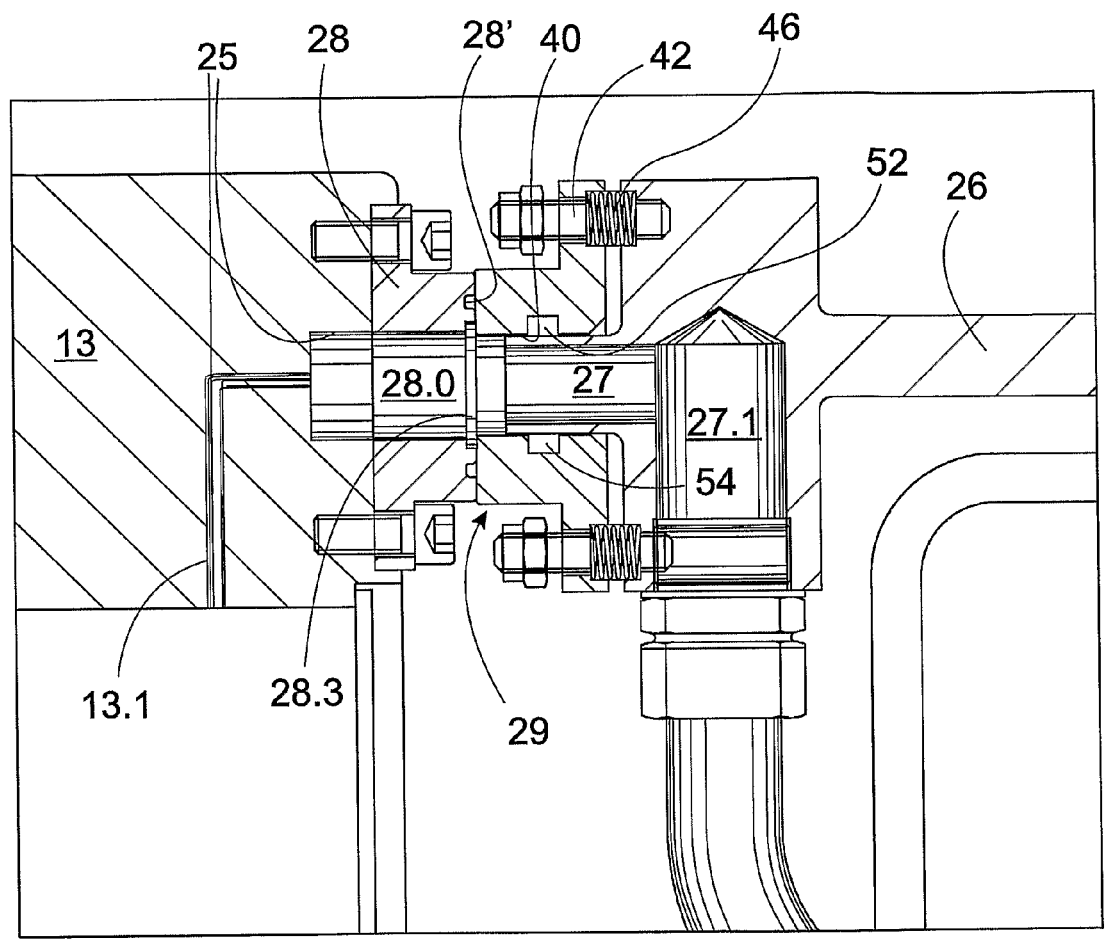
Figure 8:
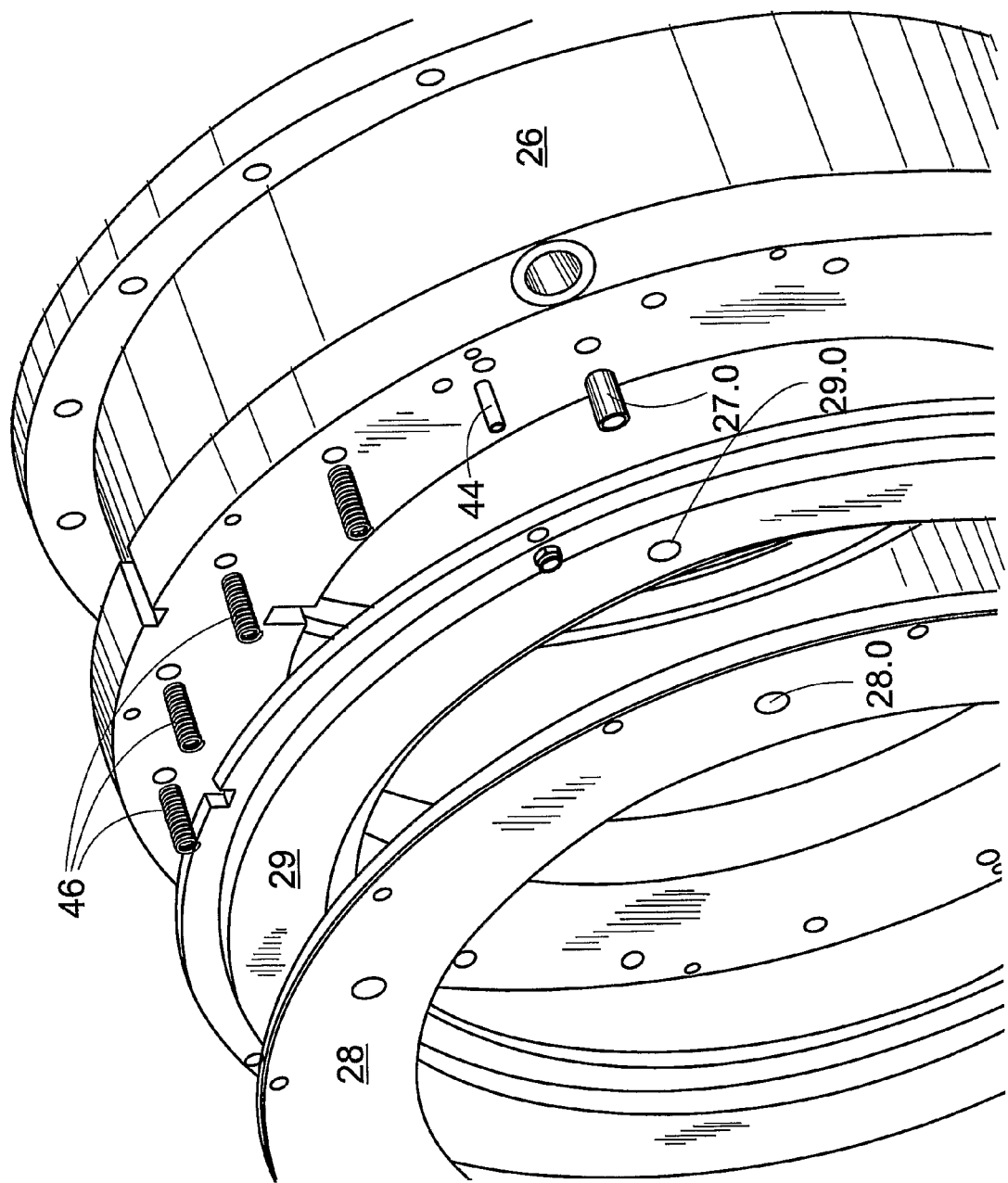
Figure 9:
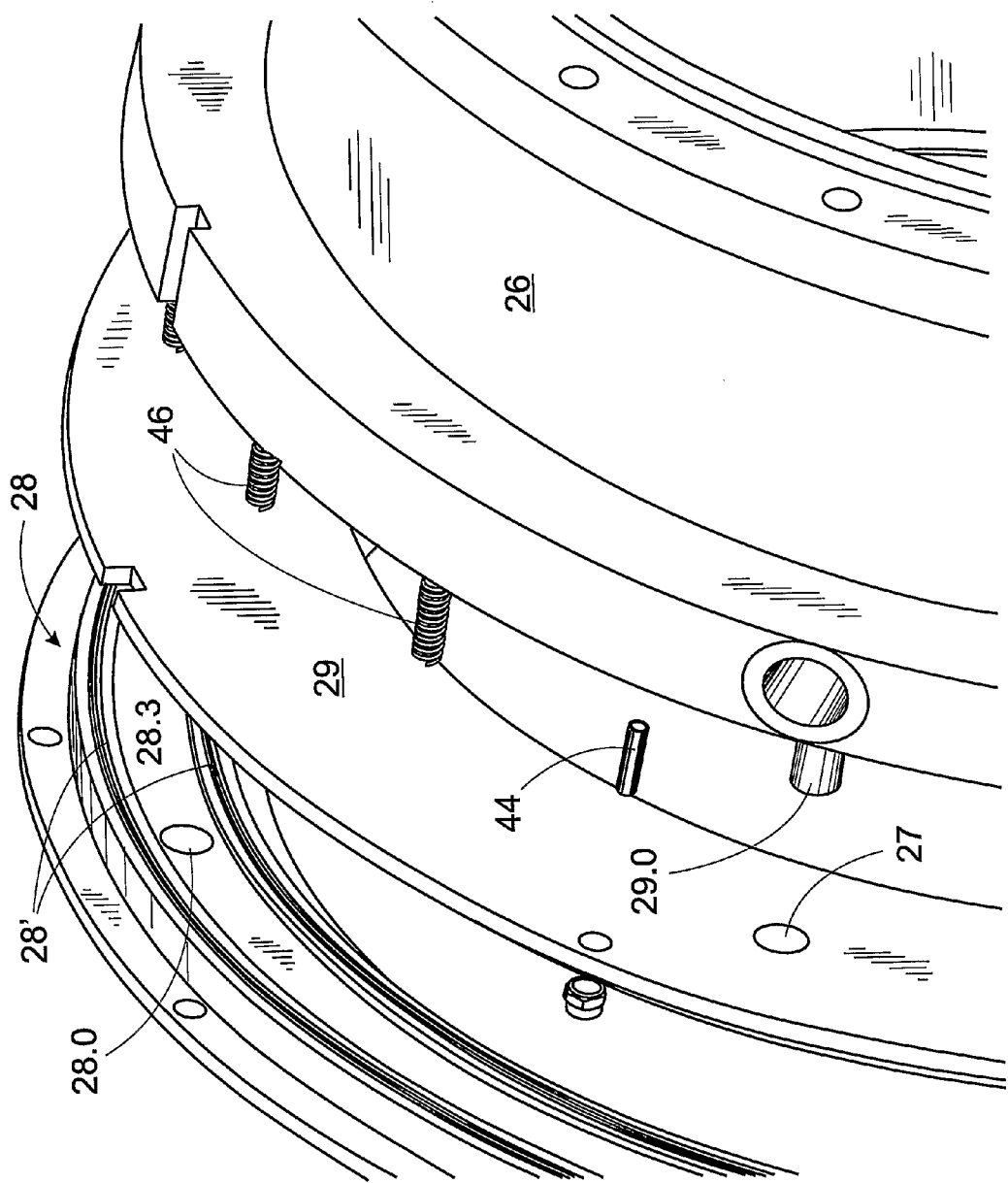
Figure 10:
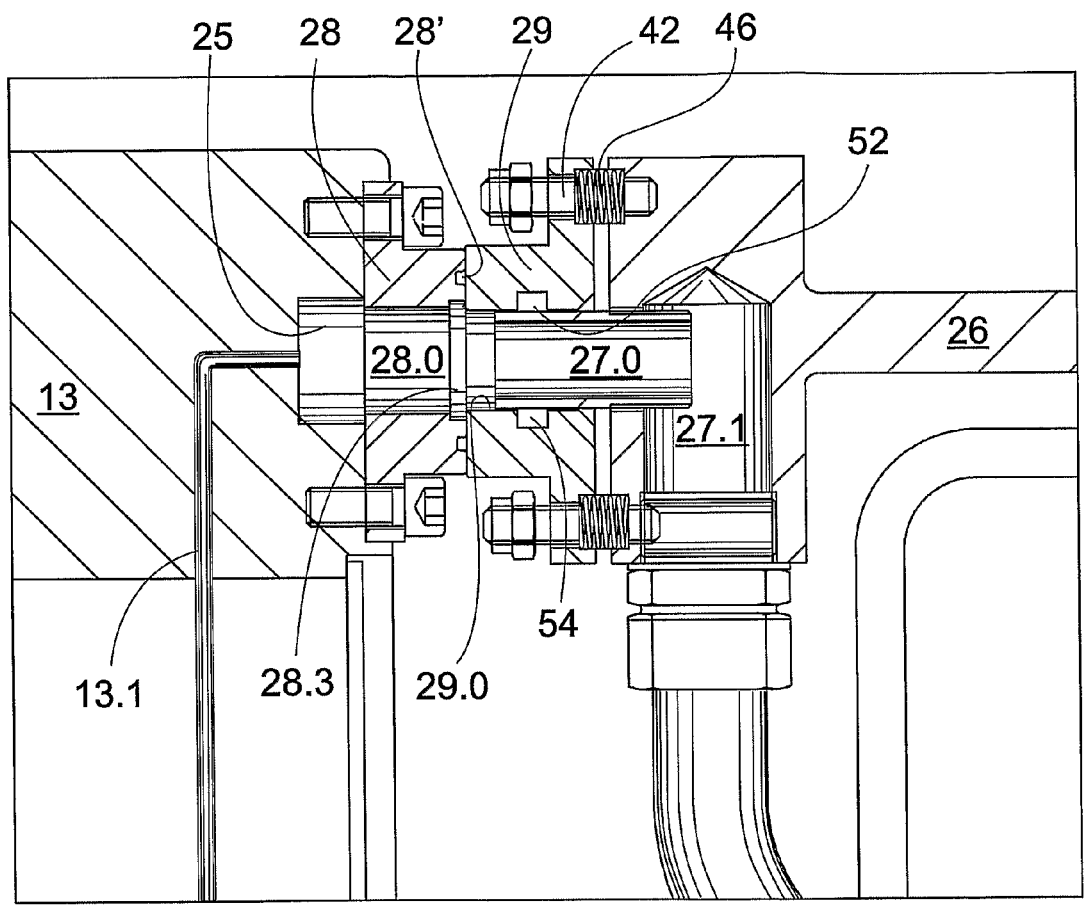

FIGS. 5-7 show in detail a construction according to another embodiment of the connection permitting rotation FIGS. 8-10 show in detail a construction according to a third embodiment of the connection permitting rotation FIGS. 1-2 show a two-stage planetary gearing 10, 30 of a wind power plant. A blade assembly, schematically indicated with B, is attached to the input shaft 11 of the planetary gearing of the first stage 10 and a generator (not shown) is connected to the output shaft 34 of the second stage 30. A hollow channel 39 extends from the generator to the shaft 11 and the blade angles of the blade assembly B are adjusted through it. In this case this hollow channel cannot be freely used in the lubrication oil system.

Planetary gearings 10, 30 comprise a common frame 8, which, due to high loads of the first stage, is slightly resilient causing an angular and/or linear deflection between the stages. This gearing is a powerful, here 3 MW, wind power plant gearing.

The input shaft 11 of the planetary gearing 10 is supported to the frame 8 with bearings D1 and it is directly connected to the planet wheel carrier 13. This further carries the planet wheels 14a, which mesh by their coggings 14', i.e. operatively engage with the cogging 15' of the internal gear and simultaneously with the cogging 16' of the central sun wheel 16. The internal gear 15' is connected to the frame by a known method.

The sun wheel 16 is supported by bearings D2 from the planet wheel carrier 13 and more precisely, at the blade assembly B end. Due to angular and other deflections the power is output via the coupling 32, which is connected to the second cogging 16" of the sun wheel 16 via its first cogging 32' and correspondingly, to the cogging 33' of the input shaft 33 of the following stage 30 via its second cogging 32". The second stage planetary gearing 30 and its supporting to the frame 8 are conventional and have no particular significance for the invention.

As such, said following stage, or the second stage, can be a mere shaft, i.e. the coupling permitting an angle difference can be directly connected to a generator or similar.

It is essential for this invention that a lubrication oil system is disposed, wherein lubrication oil is supplied from a fixed manifold 35 through a pipe connection, later shortly "connection" 20, permitting rotation to the planet wheel carrier 13, which is provided with channels for conveying lubrication oil to the desired points, here to the bearings D3 of the planet wheels 14a and to the mesh (coggings 14' and 16') between it and the sun wheel 16. For the bearings D3 lubrication oil is led from the planet wheel carrier 13 to the bearing journal 17, which has a channel 17.1 for this. In these construction-internal distribution channels quite conventional technique is applied. It is essential for the invention that the lubrication oil is supplied to a rotating and positionally changing element, here the planet wheel carrier.

For lubricating the mesh between the internal gear 15 and the planet wheels 14a the system includes manifolds 36, which can be used to spray lubrication oil to the cogging 15'.

FIGS. 2 and 3 include a detailed illustration of the connection 20 permitting rotation. FIG. 2 shows a more detailed cross-sectional view of the annular connection at the supply unit and FIG. 3 shows an exploded view of the main components. The connection 20 comprises the first connecting element 21 fixedly mounted to the frame and the rotating connecting element 22 attached to the planet wheel carrier. The first fixed connecting element 21 is provided with a cylindrical frame component 26 with connection units 27.1 to the manifold 35 and a cylindrical connecting component 40. Ring seals 29.1 and 29.2 are disposed against the inner and outer surfaces of this connecting component 40 and these rings seals are provided with ring seals 52 and 54. The ring seals 29.1 and 29.2 are allowed to slightly move with loading, as they are loosely attached with bolts 42 and 44 and are loaded with springs 46 from the frame component 26 against another set of ring seals 28.1, 28.2.

The ring seals 29.1 and 29.2 have a counter surface 29' and correspondingly, the ring seals 28.1 and 28.2 have a sliding surface 28', which is advantageously provided with a groove for a flexible sealing ring. The ring seals 28.1 and 28.2 are fixedly mounted with bolts 48 to the planet wheel carrier 13, which has further a cylindrical, laterally opening groove 25. The cylindrical connecting component 40 is loosely fitted to the groove 25, which thus rotates. The chamber opening from the groove 25 is confined by the second ring seals 28.1, 28.2, the first ring seals 29.1, 29.2 and the cylindrical connecting component 40. Lubrication oil is led to this type of chamber via the unit 27 and removed via the channel 13.1. Oil is also controllably removed via the sliding surfaces 28' and 29' for lubricating these. The spring 46 force is adapted to correspond to a pressure of approx. 1 bar, in which case it is possible to achieve a sufficient leak for lubricating the sliding surfaces at a suitable lubrication oil pressure. In the wind power plant applications, the speed remains so low that heat due to friction has no significance.

This type of spring-supported connection 20 is capable of adapting to both angular and linear deflections between the frame 8 and the planet wheel carrier 13.

The exploded drawing of FIG. 3 shows the 2+2 design of the sealing construction, i.e. two pairs of sealing rings (28.1, 28.2 and 29.1, 29.2) are attached. The cylindrical frame component 26, the first ring seals 29.1 and 29.2 and the second ring seals 28.1, 28.2 are drawn apart in the drawing (design 2+2). Also the springs 46 and the guide pins 44 are separated in the drawing.

FIG. 4 shows the lubrication oil manifold in its entirety. A fixed, circularly bent manifold 35 is attached to a pressurized lubrication oil supply unit 37. The manifold 35 has a connection to the supply units 27 distributed on the circumference 27 in the fixed connecting component 40. This is surrounded by the ring seals 29.1 and 29.2 inside and outside thereof. The ring seals 29.1 and 29.2 are allowed to slide against the inner and outer surface of the cylindrical connecting component 40 as well as against the oppositely located rotating ring seals 28.1 and 28, which are shown in FIG. 2.

FIGS. 5-7 show a simplified modification of the pipe connection construction permitting rotation. FIGS. 5 and 6 illustrate the main components of the connection axonometrically on both sides and FIG. 7 shows a corresponding straight projection. Functionally similar parts are referred to using the same reference numbers as above. The construction is now of type 2+1, as the number of non-rotating and spring-supported (first) sealing rings 29.1, 29.2 is two, but these are countered by one continuous second sealing ring 28. Here the cylindrical part 40 of the frame component 26 is shorter, but it is allowed to slide to a sufficient amount against the cylindrical surfaces of the sealing rings 29.1, 29.2, in the same way as in the previous embodiment. The unit 27 in the cylindrical part 40 leads the lubrication oil to the groove 28.3 of the second sealing ring 28, from which it can flow to the second unit 28.3 and further to the cylindrical groove 25 of the planet wheel carrier 13 or to a similar channel (see FIG. 2). The sliding surfaces 28' on both sides of the lubrication oil transfer groove 28.3 are provided with a flexible sealing in the groove.

FIGS. 8-10 show a yet more simplified modification of the pipe connection construction permitting rotation. FIGS. 8 and 9 illustrate the main components of this connection axonometrically on both sides and FIG. 10 shows a corresponding straight projection. Functionally similar parts are referred to using the same reference numbers as above. The construction is now of type 1+1, as here only one non-rotating and spring-supported (first) sealing ring 29 is disposed, countered by one continuous second sealing ring 28. This frame component 26 is provided with pipe units 27.0 aligned with the units 29.0 of the first sealing ring 29 with each unit being now composed of an opening. The second sealing ring 28 including the groove 28.3 is similar as above in FIGS. 5-7.

In a certain 1+1 type 3 MW wind turbine gearing, it was provided for a radial deflection of 1.3 mm at a distance of 2.4 m (angle error 0.031'). The construction allowed a tolerance of ±1.5 mm in the radial direction and ±5 mm in the axial direction.

Based on the above description it is understood by those skilled in the art that the design of the connection permitting rotation can be modified in various ways within the scope of the invention. In addition to the design types 2+2, 2+1 and 1+1, a type 1+2 can be readily formed. The side with and without springs can naturally also be mutually exchanged.

The invention claimed is:

1. A planetary gear arrangement having one or more planetary stages, a first stage of said planetary stages comprising:
    a planet wheel carrier having planet wheels with coggings;
    a rotatable shaft connected to said planet wheel carrier;
    an internal gear disposed coaxially relative to said planet wheel carrier;
    a centrally located sun wheel having cogging and from which power is transmitted to a next stage or out, said coggings of said planet wheels operatively engaging said internal gear and said cogging of said sun wheel;
    a frame supporting said first stage through said internal gear and causing load-induced deflection of said rotatable shaft; and
    an oil supply connection between said frame and said planet wheel carrier, said oil supply connection including:
        a first connecting element related to the frame;
        an opposite second connecting element related to said planet wheel carrier;
        a groove in one of said connecting elements;
        a supply unit arranged against said groove in said opposite connecting element; and
        annular seals on both sides of said groove;

said supply unit being surrounded by a first set of ring seals including first inner and outer ring seals defining an annular seal coaxially inside and outside thereof, said groove being confined by a second set of ring seals including second inner and outer ring seals defining another annular seal coaxially inside and outside thereof, and said first and second inner ring seals and correspondingly said first and second outer ring seals being adapted as pairs to slide against each other;

one of said first and second sets of ring seals being supported by spring elements for allowing deflection between said connecting elements;

wherein said oil supply connection is arranged to deliver lubrication and permit rotation during small deflections of said first stage.

2. An arrangement according to claim 1, wherein said groove communicates lubricant to said connecting elements.

3. An arrangement according to claim 1, wherein said first ring seals are composed of two separate ring seals, such that said supply unit is formed in a cylindrical component between said separate ring seals.

4. An arrangement according to claim 1, wherein said first ring seals are formed in a same component through which at least one pipe formed by said supply unit is placed.

5. An arrangement according to claim 1, including a two-stage planetary gearing, wherein the first stage planetary gearing is supported flexibly, and a coupling permitting an angle difference is connected to said sun wheel for transmitting power to the second stage.

6. An arrangement according to claim 1, said arrangement being disposed in combination with a wind power plant, wherein said planet wheel carrier is directly connected to a shaft of a blade assembly of said wind power plant.

* * * * *